(12) United States Patent
Vitikainen et al.

(10) Patent No.: US 7,203,297 B2
(45) Date of Patent: Apr. 10, 2007

(54) ANSWERING SERVICE GIVING DIFFERENT MESSAGES DEPENDING ON USER PROFILE SELECTED BY CALLED SUBSCRIBER AND/OR IDENTITY OF CALLING SUBSCRIBER

(75) Inventors: Timo Vitikainen, Espoo (FI); Harri Heikkinen, Vantaa (FI)

(73) Assignee: Nokia Corporation, Epsoo (FI)

( * ) Notice: Subject to any disclaimer, the term of this patent is extended or adjusted under 35 U.S.C. 154(b) by 572 days.

(21) Appl. No.: 10/240,815

(22) PCT Filed: Apr. 6, 2001

(86) PCT No.: PCT/FI01/00340

§ 371 (c)(1),
(2), (4) Date: Jan. 30, 2003

(87) PCT Pub. No.: WO01/78364

PCT Pub. Date: Oct. 18, 2001

(65) Prior Publication Data

US 2004/0022369 A1 Feb. 5, 2004

(30) Foreign Application Priority Data

Apr. 7, 2000 (FI) ................................. 20000834
May 8, 2000 (FI) ................................. 20001068

(51) Int. Cl.
*H04M 1/64* (2006.01)
*H04M 3/42* (2006.01)
*H04M 3/527* (2006.01)

(52) U.S. Cl. .......................... 379/207.02; 379/88.22; 455/412.1; 455/466

(58) Field of Classification Search ............ 379/88.22, 379/201.01, 201.02, 207.02; 455/412.1, 455/412.2, 413, 414.1, 466
See application file for complete search history.

(56) References Cited

U.S. PATENT DOCUMENTS

| | | | |
|---|---|---|---|
| 4,985,913 A * | 1/1991 | Shalom et al. ................. 379/76 |
| 5,027,384 A | 6/1991 | Morganstein ............ 379/88.23 |
| 5,579,383 A | 11/1996 | Bales et al. ............. 379/211.02 |
| 5,742,668 A | 4/1998 | Pepe et al. .................. 455/415 |
| 5,742,905 A * | 4/1998 | Pepe et al. .................. 455/461 |
| 5,768,349 A * | 6/1998 | Knuth et al. ............. 379/88.22 |
| 6,718,178 B1 * | 4/2004 | Sladek et al. ............... 455/466 |

FOREIGN PATENT DOCUMENTS

DE 19832433 A1 2/1999

(Continued)

OTHER PUBLICATIONS

*WAP Push Architectural Overview, Version 08, Nov. 1999.* Copyright: Wireless Application Protocol Forum, Ltd. 1999. pp. 1-26.

(Continued)

*Primary Examiner*—Harry S. Hong
(74) *Attorney, Agent, or Firm*—Hollingsworth & Funk, LLC

(57) ABSTRACT

The present invention relates to a telecommunications system comprising a network element (5') providing answering service for subscribers, and at least one subscriber terminal (1") comprising a memory (M1') for storing parameters associated with selectable profiles, said parameters controlling the functions of the subscriber terminal, and a user interface (2) providing the possibility to select for use one of said selectable profiles with the associated parameters. In order to achieve an improved user-friendliness said parameters stored in the memory (M1') of the subscriber terminal (1") include message parameters (MSG1, MSG2, MSG3) which identify messages (A, B, C) that are associated with the respective profiles. A profile selection carried out with the user interface (2) triggers the transmitter (4) to transmit an activation message (ACT) to the network element (5'). The network element is responsive to said activation message (ACT) for activating the message or messages indicated by the activation message such that the activated message or messages (A, B) can be transmitted from the memory means (M2') to a calling subscriber under predetermined conditions.

14 Claims, 4 Drawing Sheets

FOREIGN PATENT DOCUMENTS

| | | |
|---|---|---|
| EP | 0884885 A2 | 12/1998 |
| EP | 0939535 A2 | 9/1999 |
| EP | 0944226 A2 | 9/1999 |
| EP | 0991249 A1 | 4/2000 |
| GB | 2329298 A | 3/1999 |
| WO | WO 99/29091 | 6/1999 |

OTHER PUBLICATIONS

Information and Communication Products Group, "Siemens Glgaset 3015 Classic", Operating Instructions, Siemens Aktiengesellschaft, Germany, Ref. Nr. A31008-G3015-B001-1-19, Sep. 1999.

* cited by examiner

ANSWERING SERVICE GIVING DIFFERENT MESSAGES DEPENDING ON USER PROFILE SELECTED BY CALLED SUBSCRIBER AND/OR IDENTITY OF CALLING SUBSCRIBER

BACKGROUND OF THE INVENTION

The present invention relates to a telecommunications system and more specifically to a solution which makes it easy for a subscriber to update information relating to his answering service.

A telecommunications system is known having a subscriber terminal including a memory for storing parameters associated with selectable profiles. The parameters of each individual profile define how the subscriber terminal functions when the profile in question has been selected for use. The user of this prior art subscriber terminal might for instance via the user interface define that the subscriber terminal is completely silent when a "Meeting" profile is active. Thus a terminating call to the subscriber terminal will not set off the normal loud ringing tone while the subscriber terminal has the "Meeting" profile active, as the parameter associated with the "Meeting" profile define that the subscriber terminal should be silent. Instead the subscriber terminal will be silent until the user of the subscriber terminal selects another profile for use, where the associated parameters no longer define that the subscriber terminal should be silent.

This prior art subscriber terminal also offers the user the possibility to transfer his calls to an answering service when predetermined conditions are met. One such predetermined condition might for instance be that the user does not answer a terminating call within a time limit.

In this prior art solution, the answering service is provided by a network element. The user can store a message in a memory means of the network element by calling a predetermined number. The message is stored in the network element such that the user of the mobile station speaks the message into the microphone of his subscriber terminal after the connection to the network element has been established, and the network element records the message. The connection between the mobile station and the network element is disconnected after the message has been spoken.

The prior art system described above is not very user-friendly. The user is given a possibility to store a message in the answering service by calling the predetermined number. If the user for some reason wants to change his message, he must again call the number and store the new message in place of the old.

SUMMARY OF THE INVENTION

An object of the present invention is to solve the drawbacks associated with the prior art solutions and to provide a solution which makes it possible to improve the user-friendliness of the answering service in a telecommunications system.

Another object of the present invention is to provide a solution which makes it possible for a service subscriber to ensure that a person whose call is connected to his answering service will in each situation get a message which is as informative as possible.

The above-mentioned and other objects of the present invention are achieved by a telecommunications system comprising a network element, and at least one subscriber terminal comprising: a transmitter for transmitting signals, a memory for storing parameters associated with selectable profiles, said parameters controlling the functions of the subscriber terminal at least in connection with a terminating call, and a user interface providing the possibility to select for use one of said selectable profiles with the associated parameters. The system of the present invention is characterized in that said parameters stored in the memory of the subscriber terminal include message parameters which identify messages that are associated with the respective profiles, and in that a profile selection carried out with the user interface triggers the transmitter to transmit an activation message to the network element, and said network element comprises a memory means for storing several optional messages for a subscriber, and control means which are responsive to said activation message for activating the message or messages indicated by the activation message, such that the activated message or messages can be transmitted from the memory means to a calling subscriber of the system under predetermined conditions.

The present invention also relates to a subscriber terminal which can be used in said telecommunications system and which comprises a transmitter for transmitting signals, a memory for storing parameters associated with selectable profiles, said parameters controlling the functions of the subscriber terminal at least in connection with a terminating call, and a user interface providing the possibility to select for use one of said selectable profiles with the associated parameters. The subscriber terminal of the present invention is characterized in that said parameters stored in the memory include message parameters which identify messages stored in a memory means that are associated with the profiles, whereby a profile selection carried out with the user interface triggers an activation of the message or messages associated with said profile in the memory means such that the activated message or messages can be transmitted from the memory means to a subscriber of the system under predetermined conditions.

The present invention also relates to a network element providing service for a subscriber of a telecommunications system, said network element comprising: memory means for storing messages, and control means for retrieving a stored message and for transmitting it to a calling subscriber. The network element of the present invention is characterized in that said memory means is adapted to store several optional messages for said subscriber, and the control means of the network element are responsive to an activation message received from said subscriber for activating a message or messages indicated by the activation message such that the activated message or messages can be transmitted from the memory means to said calling subscriber under predetermined conditions.

The invention is based on the idea that the user-friendliness of a telecommunications system can be improved when a service subscriber is given the opportunity to store several optional messages in a memory means, and when the selection of the active message or messages is made dependent on the profile selection carried out with the user interface of a subscriber terminal. The terms 'active message' and 'activated messages' refer here to the message or messages which at a particular moment are in use, in other words, if a message is transmitted to a calling subscriber, then it will be one of the active messages.

The present invention makes it very easy for a service subscriber to change the active message such that it at each moment is most appropriate and informative. For instance, during a meeting a user might activate a profile called "Meeting" which will trigger the transmission of a message informing a calling subscriber that the user will be unavailable for a couple of hours. During his holiday the user might activate a profile called "Holiday" which will trigger the transmission of a message informing a calling subscriber that the user is on holiday and Mr. NN will take care of any urgent job matters during the holiday.

The most significant advantage of the present invention is the improved user-friendliness, as the selection of the active message is controlled with the profile selection, and thus the profile selection will have an impact both on the functions of the subscriber terminal and on the message transmitted to a calling subscriber terminal when the user is not able to answer the call. Another advantage of the present invention is that a person attempting to call the service subscriber (in other words, the user of the subscriber terminal) will in each situation get a message which is as informative as possible. Instead of a standard message used in all situations, the message will be selected by the service subscriber for that particular moment.

In a preferred embodiment of the invention, the memory means containing the messages for a service subscriber is arranged in a network element. In this embodiment, a profile selection carried out by the service subscriber with a user interface of a subscriber terminal will trigger a transmission of an activation message to the network element. The activation message will indicate to the network element the message or the messages that should be active from than moment on. It is possible that the service subscriber has several subscriber terminals available. In that case the service subscriber can use the same network element and messages for any of these subscriber terminals. It is, in other words, sufficient to have one answering service for one service subscriber even though the service subscriber might use this answering service with several different subscriber terminals.

In another preferred embodiment of the invention, the memory means is arranged in the subscriber terminal. In this embodiment, a call attempt to the service subscriber will be connected to the subscriber terminal, and the subscriber terminal will transmit the activated message to the calling subscriber terminal. Thus it is not necessary to have a network element providing an answering service in the telecommunications network, but instead this embodiment makes it possible to "integrate" the answering service in a subscriber terminal.

In still another preferred embodiment of the invention, identifiers are stored with the messages in the memory means. When a terminating call arrives, the identifier identifying the calling subscriber is compared with the identifiers stored with the active messages in the memory means. If the comparison indicates that the identifiers match for one of the activated messages, then the message in question is transmitted to the calling subscriber. This preferred embodiment of the invention makes it possible to store personal messages in the memory means. For instance, two different messages might be active when the "Meeting" profile is selected for use. The message which is transmitted to a calling subscriber is then determined based on the identifier of the calling subscriber. The calling subscriber can be identified based on the subscriber terminal he is using. Thus the identifier identifying the calling subscriber can consist for instance of a MSISDN-number of a mobile station or of an IP-address of the used subscriber terminal, for instance.

In still another embodiment of the invention, at least one of the messages stored in the memory means contains data for presenting a menu of available options to the calling subscriber, and the telecommunications system comprises means for receiving information indicating the option selected by said calling subscriber among said available options and for serving the calling subscriber according to the selected option. This embodiment makes it possible for the service subscriber to give the calling subscriber the possibility to select a suitable option of how to proceed when the service subscriber is unable to answer the call. Such options might be to be connected to a predetermined number (secretary), to send an SMS (Short-Message Service) message or to leave a message.

The preferred embodiments of the system, the subscriber terminal and the network element are disclosed in the attached dependent claims 2 to 6, 8 to 14 and 16 to 19.

BRIEF DESCRIPTION OF THE DRAWINGS

In the following, the invention will be described by way of examples with reference to the accompanying drawings, in which.

DETAILED DESCRIPTION OF THE INVENTION

Figure 1:
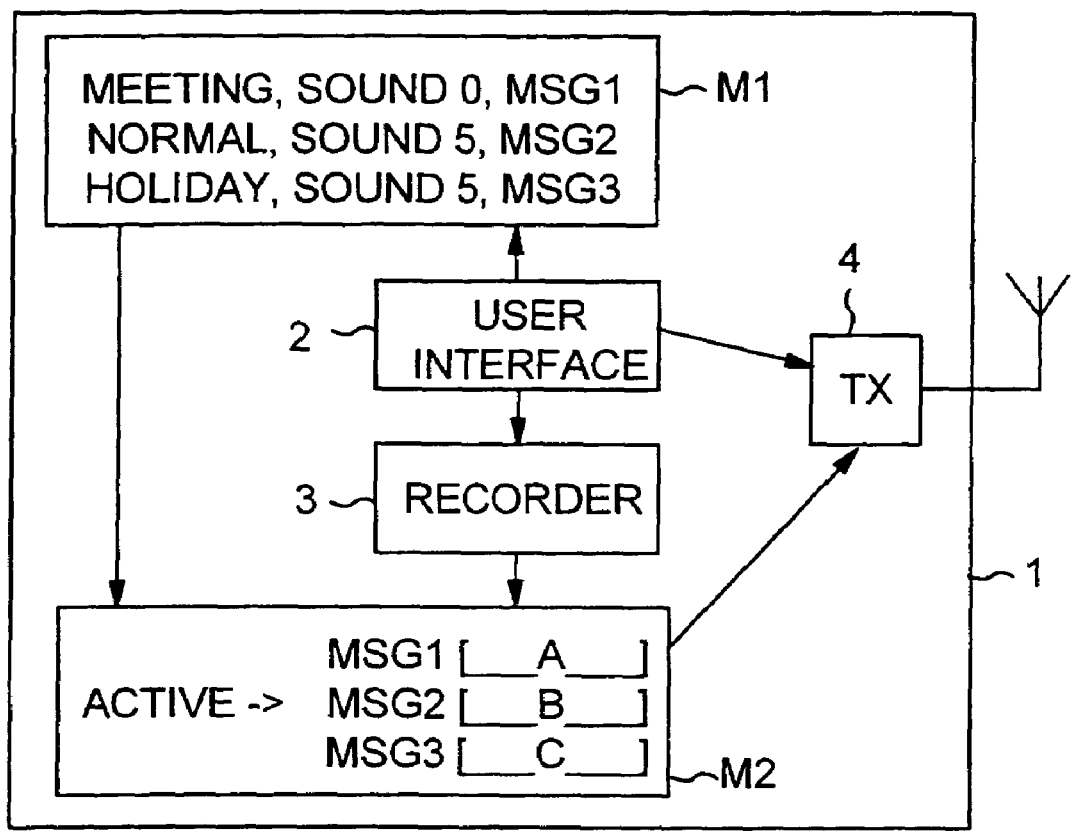
FIG. 1 is a block diagram of a first preferred embodiment of the subscriber terminal according to the present invention.

FIG. 1 is a block diagram of a first preferred embodiment of the subscriber terminal according to the present invention. The subscriber terminal 1 of FIG. 1 can be a mobile station of a mobile communications system, for instance.

The subscriber terminal comprises a user interface 2 including for instance a display, a keyboard, a microphone and a loudspeaker. The user of the subscriber terminal 1, in other words, the service subscriber, can use the user interface to record a new message. The message can include text, speech, an image, a video clip or a multimedia message. Images and video clips can be recorded for instance such that the subscriber terminal is connected to a video camera or to a computer terminal, and the message is transferred to the subscriber terminal. Alternatively, a camera and/or other recording means are arranged in the subscriber terminal. A text message can be entered by using the keyboard of the subscriber terminal or a separate keyboard attached or connected to the subscriber terminal. Alternatively, if the subscriber terminal has a speech control function which makes it possible to give voice commands to the subscriber terminal, it is possible for the user to speak the message into the microphone of the subscriber terminal, in which case the speech control function converts the speech into text. In the following description relating to all the drawings 1 to 3, it is by way of example assumed that the message is a speech message, although any other message type is also possible according to the present invention.

A speech message is recorded with the recorder 3 included in the subscriber terminal. The user of the subscriber terminal first selects a mode for recording speech messages by using the keyboard, and then he speaks the message B into the microphone of the subscriber terminal.

The recorded message B is stored in the memory means M2 together with a message parameter MSG2 identifying the message.

In order to activate the message B, the user of the subscriber terminal 1 must first select the mode for connecting a message to a specific profile. In this case, it is assumed that the user wants to define that the message B with the message parameter MSG2 shall be used in connection with the profile 'NORMAL'. This selection can be done with the keyboard, or for instance by voice commands if a speech control function is available.

FIG. 1 shows that there are, at that moment, three different profiles available for the subscriber terminal 1. The parameters associated with these profiles are stored in the memory M1. The parameters associated with a profile define how the subscriber terminal functions when the profile in question is selected for use. If the user in the case of FIG. 1 uses the keyboard of the user interface 2 to select for use the profile 'NORMAL', then the subscriber terminal enters a mode where the sound level 5 (parameter SOUND 5) will be used for alerting of a terminating call. When the selection is done, the message parameter MSG2 is fed from the memory M1 to the memory means M2 in an activation message. Thus the message B, with the message parameter MSG2, will be activated in the memory means M2. If a calling subscriber terminal at that moment tries to make a call to the subscriber terminal 1, and the user of the subscriber terminal 1 does not answer the call within a predefined time period, then the transmitter 4 of the subscriber terminal 1 will transmit the active message B to the calling subscriber terminal.

FIG. 1 suggests that the messages and the parameters associated with the different profiles should be stored in different memories. This is naturally only one example of how to store this information. In practice it might be appropriate to store both the parameters associated with the profiles and the messages in the same memory.

Figure 2:
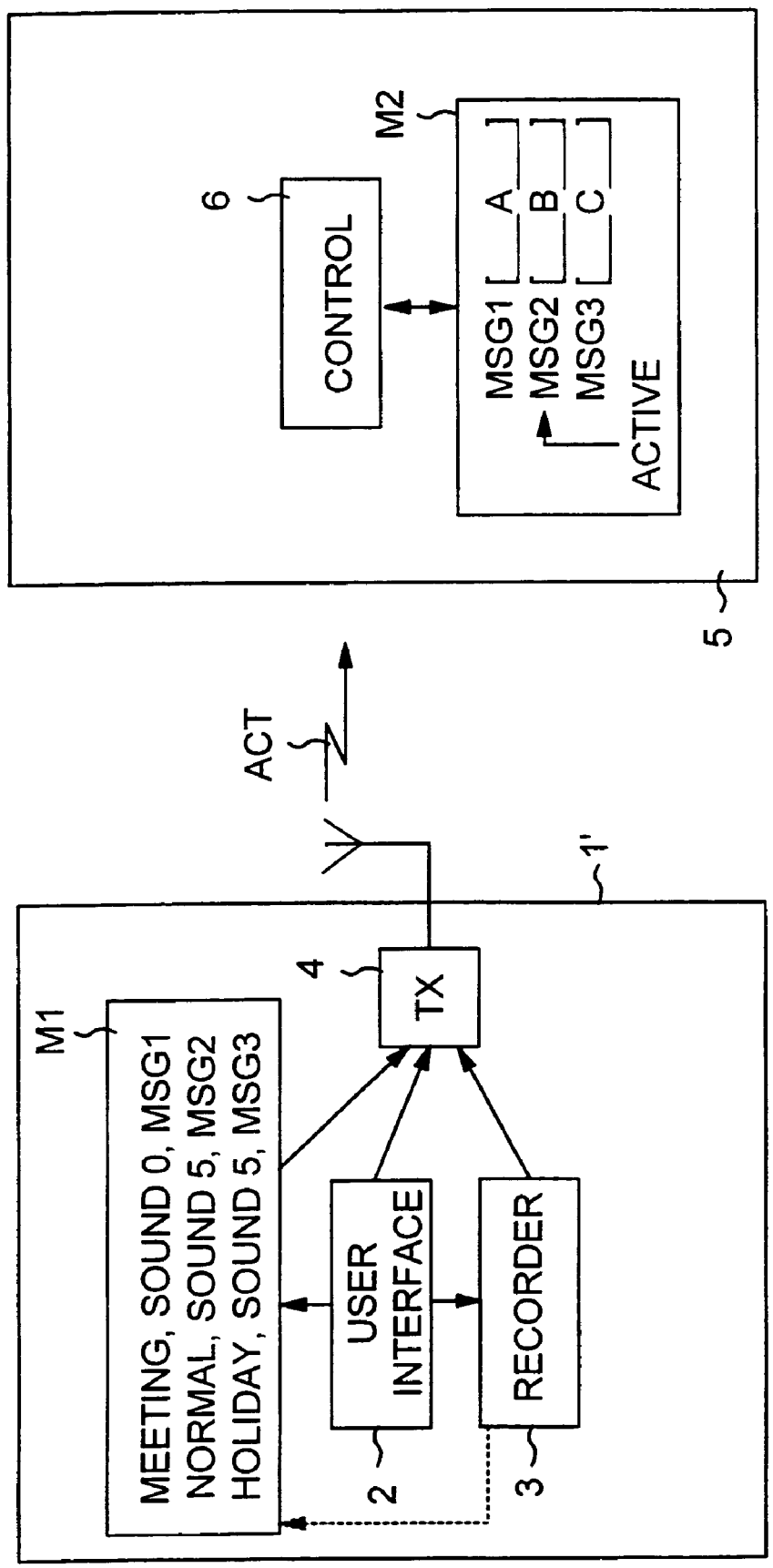
FIG. 2 is a block diagram illustrating a first preferred embodiment of the telecommunications system according to the present invention.

FIG. 2 is a block diagram illustrating a first preferred embodiment of the telecommunications system according to the present invention. The system shown in FIG. 2 uses a second preferred embodiment of the subscriber terminal of the present invention.

The subscriber terminal 1' corresponds to the subscriber terminal 1 described in connection with FIG. 1, except that the memory means M2 is not arranged in the subscriber terminal 1', but instead into the network element 5 providing an answering service for the subscriber terminal 1'. Thus the messages available for use are stored in the network element 5. When the user of the subscriber terminal 1' selects a profile for use with the user interface 2, the transmitter 4 of the subscriber terminal 1' transmits an activation message ACT to the network element 5. The activation message is naturally transmitted via a base station of the system, but for simplicity only the network element 5 is shown in FIG. 2.

The activation message ACT transmitted by the subscriber terminal to the network element 5 includes a message parameter indicating the message which should be activated. For instance, when the user of the subscriber terminal has selected the profile 'NORMAL' for use, then the message parameter MSG2 is included in the activation message ACT. A control unit 6 of the network element 5 activates the message B when it receives the activation message with the message parameter MSG2. Thus the message B will be transmitted to a calling subscriber terminal for instance when the user of the subscriber terminal 1' does not answer his call. There might naturally also be other predetermined conditions defined for transmitting the activated message, such as when the subscriber terminal is turned off or when the subscriber terminal has another call going on. Such conditions can be defined by the user with the message parameters which are transmitted from the subscriber terminal to the network element in the activation message, for instance.

When the user wants to record a new message, such as a speech message, he speaks the message into the microphone of the user terminal as described in connection with FIG. 1. The subscriber terminal then transmits this new message, for instance message B, with associated message parameters, for instance MSG2, to the network element 5. The control unit of the network element stores this new message with the associated message parameter into the memory means 5. In case a message already exists with the same message parameter MSG2, then the previous message will be replaced by the new message.

A new message might be transmitted from the subscriber terminal to the network element immediately when it has been recorded. Alternatively, the subscriber terminal 1' can store this new message temporarily in the memory M1. The message is stored in the memory M1 until the user of the subscriber terminal 1' the next time activates a profile using this new message. At that moment, the new message with the associated message parameters is transmitted to the network element 5 in connection with the transmission of the activation message. The control unit 6 will detect the new message, store it in the memory means and activate the message.

The network element 5 might be for instance an ICAS server (Intelligent Call Answering Service) which is arranged in connection with an MMSC (Multimedia Message Service Center) in a third-generation mobile communications system. In that case, the activation message and the messages used for storing new messages into the memory means M2 might be for instance MMS messages (Multimedia Message Service) where the ICAS server has been defined as the receiver and an MSISDN number (Mobile Station ISDN number) or an IP-address has been defined as the sender of the message. A ICAS server makes it possible to transmit messages of practically any kind, such as text, sound, images or video.

According to the present invention, it is sufficient to store the messages of a subscriber terminal only in the memory means M2 of the network element as described previously. However, further advantages can be obtained in case the messages are also stored in the subscriber terminal. In that case, the user of the subscriber terminal can read, look or listen (depending on the message type) to the messages he has stored without a need to establish a contact to the network element. If the subscriber then decides to change one of the messages, this new message can at that moment be stored in the memory of the subscriber terminal only (indicated by a dotted line in FIG. 2), from where it can be transmitted to the network element at an appropriate moment, for instance when the user activates a profile using the new message.

Figure 3:
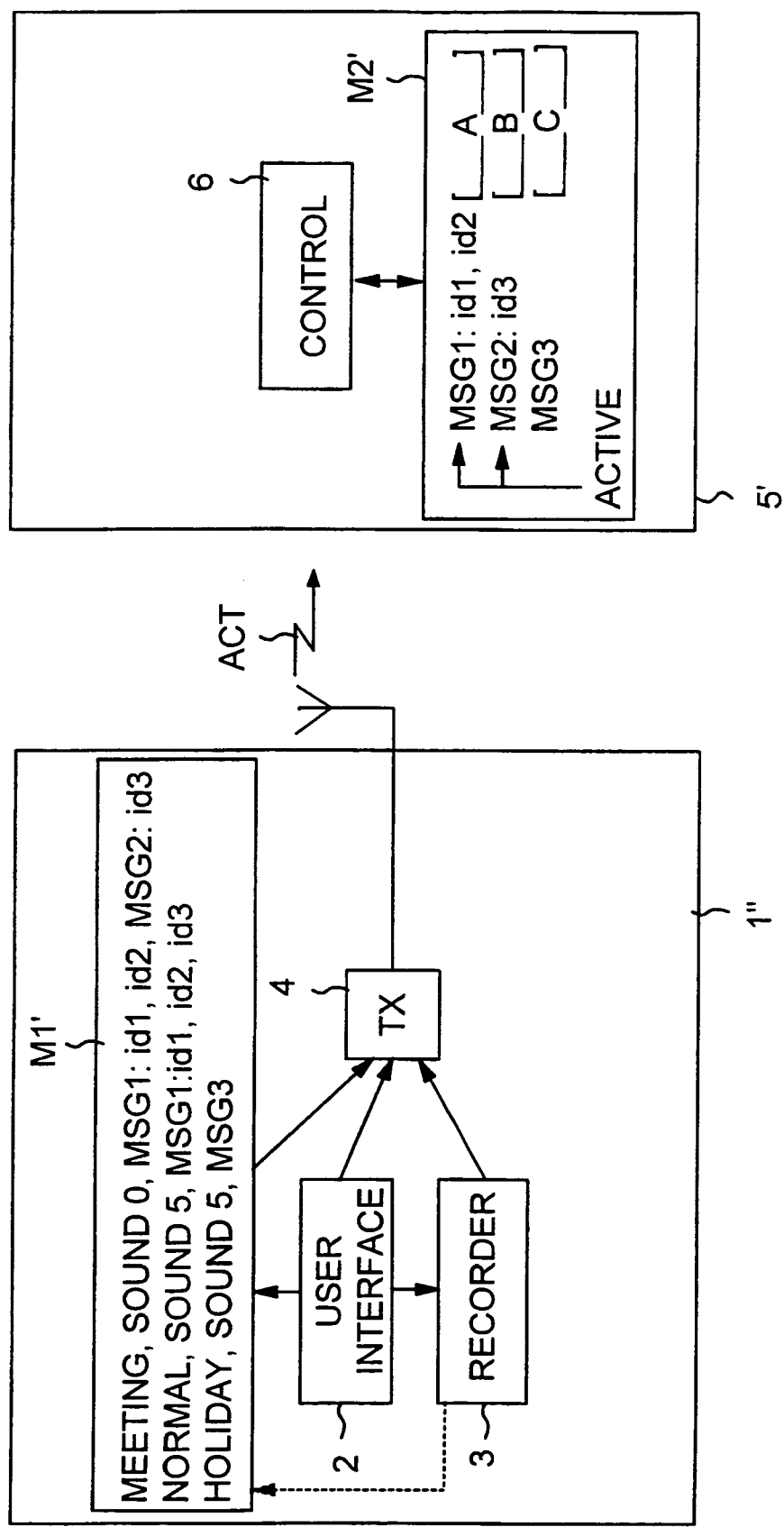
FIG. 3 is a block diagram illustrating a second preferred embodiment of the telecommunications system according to the present invention.

FIG. 3 is a block diagram illustrating a second preferred embodiment of the telecommunications system according to the present invention. The embodiment of FIG. 3 corresponds in other aspects to the one in FIG. 2, but the embodiment of FIG. 3 makes it possible for the user of the subscriber terminal 1" to leave personal messages designated for predefined calling subscriber terminals. Thus separate messages can be used for the user's wife or boss, for instance.

In FIG. 3, the message parameters stored in the memory M1' of the subscriber terminal 1" and the memory means M2' of the network element include identifiers id1, id2 and id3 which identify other subscribers (or subscriber groups). The subscriber or subscriber groups can be identified for instance based on the identifiers of the subscriber terminals used by these subscribers. For instance, the identifier id1 might consist of the MSISDN number or of the IP-address of a specific mobile station. The user of the subscriber terminal 1" might for instance have fed these identifiers into his subscriber terminal with the keyboard when he updated the parameters for the different profiles.

FIG. 3 shows that there are two simultaneously active messages in the network element 5" due to the fact that the user has selected the profile 'MEETING' for use. When the previously mentioned mobile station attempts to call the subscriber terminal 1", but the user of the subscriber terminal does not answer the call, the call is forwarded to the network element 5". The network element receives the MSISDN number of the calling mobile station. At that moment, the control unit 6 of the network element compares the received MSISDN number with the identifiers id1 and id2 of the activated messages. The result of the comparison indicates a match for the message A (MSG1). Thus the control unit 6 will control the network element to transmit the message A to the calling mobile station. However, if the caller had been a subscriber terminal with an MSISDN number corresponding to the identifier id3, then the transmitted message would instead have been the message B (MSG2).

As should be apparent from the previous description, the embodiment of FIG. 3 makes it possible to personalize the messages such that the user of the subscriber terminal can in advance store different messages for different callers in one single profile. It is also possible according to the present invention to store one default message, which will be used in case the MSISDN of the calling subscriber does not match any of the identifiers stored for the active messages.

Figure 4:
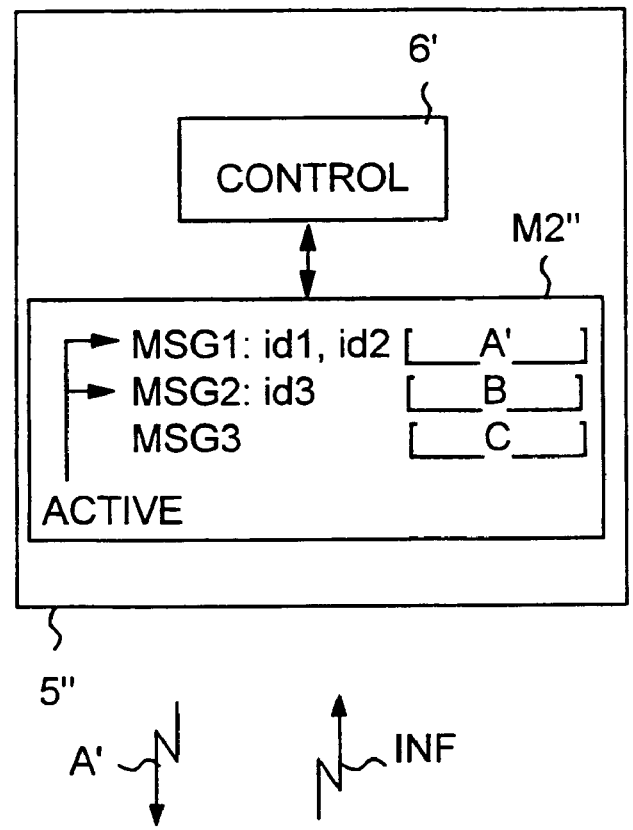
FIG. 4 is a block diagram illustrating a third preferred embodiment of the telecommunications system according to the present invention.

FIG. 4 is a block diagram illustrating a third preferred embodiment of the telecommunications system according to the present invention. The embodiment of FIG. 4 is very similar to the one described in connection with FIG. 3. However, the embodiment of FIG. 4 makes it possible for a service subscriber to include data for a menu in a message stored in the memory means M2".

In FIG. 4 it is assumed that the service subscriber has selected for use a profile 'MEETING' with his subscriber terminal. Thus the messages A' and (MSG1) and B (MSG2) are active in the memory means M2". The message A' is assumed to include data needed for presenting a menu of available options to a calling subscriber. When a calling subscriber at that moment makes a call attempt to the service subscriber by using the subscriber terminal 7, the call attempt is routed to the network element 5". It is assumed that the identifier of the subscriber terminal 7 corresponds to the identifier id1 stored with the message A' in the memory means. Thus the control unit 6' will control the network element 5" to transmit the message A' to the subscriber terminal 7: It should be observed that the message A' is naturally transmitted via a base station of the system to the subscriber terminal 7, but for simplicity only the network element 5" and the subscriber terminal 7 are shown in FIG. 4.

The message A' includes data for presenting a menu of available options for the calling subscriber. Thus subscriber terminal 7 will present the menu shown in FIG. 4 on a display of the subscriber terminal 7. The calling subscriber can then by making a selection from this menu, by using the user interface of the subscriber terminal 7, indicate to the telecommunications system how he would like to proceed with the call attempt. The subscriber terminal 7 transmits information INF indicating the selection made by the calling subscriber to the network element 5". The network element identifies the selected option and serves the calling subscriber according to the selection information INF.

The embodiment of FIG. 4 makes it possible for instance for the calling subscriber to be connected to the secretary of the service subscriber by selecting this option with the user interface of the subscriber terminal 7. In that case the network element will receive selection information INF indicating that the call should be forwarded to a predetermined number, in other words, to the telephone number of the secretary. The number can be included in the menu data included in the message A' which is stored in the memory means M2".

The menu which is presented on the display of the subscriber terminal 7 can also offer the calling subscriber a possibility to select a connection type, such as one the following options: video, voice data and short message (SMS). Thus, if the calling subscriber for instance decides to leave a message, he can select the type of message he wants to leave, such as a video message.

If the subscriber terminal 7 is a mobile station with WAP (Wireless Application Protocol) capabilities then the message including the menu with the available options can be sent to the subscriber terminal by utilizing the WTA (Wireless Telephony Application) and WAP push functionalities before the call is connected. The WTA and WAP push functionalities are described in more detail for instance in the references:

1) (WAP-165) "WAP Push Architectural Overview Version 8, Nov. 1999", Wireless Application Protocol Forum Ltd. 1999, and 2) (WAP-169) "WAP WTA, Version 8, Nov. 1999, Wireless Application Protocol Wireless Telephony Application Specification", Wireless Application Protocol Forum, Ltd, 1999.

Both of the above mentioned references are available over the Internet from the address: http://www.wapforum.org/what/technical.htm.

It is to be understood that the above description and the accompanying figures are only intended to illustrate the present invention. It will be obvious to a person skilled in the art that the invention can be varied and modified in many ways without departing from the scope and spirit of the invention disclosed in the attached claims.

The invention claimed is:

1. A telecommunications system, comprising:
   a network element; and
   at least one subscriber terminal comprising:
   a transmitter for transmitting signals;
   a memory for storing parameters associated with selectable profiles, said parameters controlling the functions of the subscriber terminal at least in connection with a terminating call; and
   a user interface providing the possibility to select for use one of said selectable profiles with the associated parameters, wherein said parameters stored in the memory of the subscriber terminal include message parameters which identify messages that are associated with the respective profiles, whereby a profile selection carried out with the user interface triggers the transmitter to transmit an activation message to the network element; and
   said network element comprises a memory means for storing several optional messages for said at least one subscriber terminal, and control means which are responsive to said activation message for activating the message or messages indicated by the activation message, such that the activated message or messages can be transmitted from the memory means to a calling subscriber of the system under predetermined conditions.

2. A system as claimed in claim 1, wherein at least one of said messages stored in said memory means contains data for presenting a menu of available options to the calling subscriber; and said telecommunications system comprises means for receiving information indicating the option selected by said calling subscriber among said available options and for serving the calling subscriber according to the selected option.

3. A system as claimed in claim 2, wherein one or several of the following options is included in said menu: rerouting the call to a predetermined number, connecting the call to the subscriber terminal in case of an emergency, and allowing the calling subscriber to leave a message; and said menu also offers the calling subscriber a possibility to select a connection type among one or several of the following options: video, voice data, and short message.

4. A system as claimed in claim 1, wherein identifiers identifying calling subscribers are with at least some of the messages stored in the memory means;

said network element comprises means for receiving an identifier identifying a calling subscriber attempting to make a call terminating at said at least one subscriber terminal; and said control means are adapted to compare the received identifier with corresponding identifiers stored in the memory means in connection with the respective activated messages, and if the comparison indicates that the identifiers match for one of the activated messages, to transmit said message to the calling subscriber.

5. A system as claimed in claim 1, wherein said subscriber terminal comprises means for receiving or recording and for storing in the memory a new message with associated message parameters entered by a user of the subscriber terminal;

said transmitter is arranged to transmit said new message to the network element in connection with an activation message when a profile that is associated with said new message is selected with the user interface; and said network element is arranged to receive said new message, to store the new message in the memory means, and to activate the new message.

6. A system as claimed in claim 1, wherein at least one of said messages is a text message, a voice message, an image, a video message or a multimedia message.

7. A subscriber terminal of a telecommunications system, comprising:

a transmitter for transmitting signals;

a memory for storing parameters associated with selectable profiles, said parameters controlling the functions of the subscriber terminal at least in connection with a terminating call; and a user interface providing the possibility to select for use one of said selectable profiles with the associated parameters, wherein said parameters stored in the memory include message parameters which identify messages stored in a memory means that are associated with the profiles, whereby a profile selection carried out with the user interface triggers an activation of the message or messages associated with said profile in the memory means such that the activated message or messages can be transmitted from the memory means to a calling subscriber under predetermined conditions.

8. A subscriber terminal as claimed in claim 7, wherein at least one of said messages stored in said memory means contains data for presenting a menu of available options to the calling subscriber.

9. A subscriber terminal as claimed in claim 7, wherein several optional messages are associated with at least one of said profiles and that the associated message parameters define the predetermined conditions for transmitting the messages.

10. A subscriber terminal as claimed in claim 7, wherein said memory means containing messages is arranged in a network element; and said transmitter of the subscriber terminal is adapted to transmit an activation message to the network element for activating the message or messages associated with the selected profile as a response to the profile selection carried out with the user interface.

11. A subscriber terminal as claimed in claim 7, wherein said subscriber terminal comprises means for receiving or recording a new message entered by a user of the subscriber terminal and for forwarding said new message to the memory means.

12. A subscriber terminal as claimed in claim 7, wherein said subscriber terminal comprises means for receiving or recording and for storing in the memory a new message entered by a user of the subscriber terminal; and said transmitter is arranged to transmit said new message to the network element in order to store the new message in the memory means when a profile that is associated with said new message is selected with the user interface.

13. A subscriber terminal as claimed in claim 7, wherein said memory means containing messages is arranged in said subscriber terminal.

14. A subscriber terminal as claimed in claim 13, wherein identifiers identifying subscribers are with at least some of the messages stored in the memory means;

said subscriber terminal comprises means for receiving an identifier identifying a calling subscriber attempting to make a call terminating at said subscriber terminal; and said subscriber terminal is adapted to compare the received identifier with corresponding identifiers stored in the memory means with the respective activated messages, and if the comparison indicates that the identifiers match for one of the activated messages, to transmit said message to the calling subscriber.

* * * * *